United States Patent
Han et al.

(10) Patent No.: US 12,389,275 B2
(45) Date of Patent: Aug. 12, 2025

(54) METHOD FOR AI BASED LOAD PREDICTION

(71) Applicant: ZTE Corporation, Shenzhen (CN)

(72) Inventors: Jiren Han, Shenzhen (CN); Yin Gao, Shenzhen (CN); Dapeng Li, Shenzhen (CN); Zhuang Liu, Shenzhen (CN); Jiajun Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 345 days.

(21) Appl. No.: 17/852,713

(22) Filed: Jun. 29, 2022

(65) Prior Publication Data

US 2022/0330090 A1    Oct. 13, 2022

Related U.S. Application Data

(63) Continuation of application No. PCT/CN2020/109196, filed on Aug. 14, 2020.

(51) Int. Cl.
*H04J 1/16* (2006.01)
*G06N 5/022* (2023.01)
*H04W 28/086* (2023.01)

(52) U.S. Cl.
CPC .......... *H04W 28/086* (2023.05); *G06N 5/022* (2013.01)

(58) Field of Classification Search
CPC ........... H04W 28/086; H04W 28/0942; H04W 28/08; G06N 5/022; G06N 3/044; G06N 3/045; G06N 5/01; G06N 20/20
USPC ....................................................... 370/230
See application file for complete search history.

(56) References Cited

U.S. PATENT DOCUMENTS

| | | | |
|---|---|---|---|
| 11,397,634 B1* | 7/2022 | Monga ................. | G06F 11/3058 |
| 2019/0005411 A1 | 1/2019 | Eads | |
| 2019/0289470 A1* | 9/2019 | Vaidya ................... | H04W 16/14 |
| 2020/0260324 A1* | 8/2020 | Byun ....................... | H04W 4/70 |
| 2020/0374201 A1 | 11/2020 | Wang et al. | |
| 2021/0068183 A1* | 3/2021 | Xu ........................ | H04W 76/27 |
| 2021/0342836 A1* | 11/2021 | Cella ........................ | G06N 7/01 |
| 2021/0385646 A1* | 12/2021 | Liu ........................ | H04W 24/04 |

(Continued)

FOREIGN PATENT DOCUMENTS

| | | |
|---|---|---|
| CN | 106790706 A | 5/2017 |
| CN | 108270661 A | 7/2018 |

(Continued)

OTHER PUBLICATIONS

Extended European Seach Report for European Patent Application No. 20949140.6 dated Jul. 18, 2023, 10 pages.

(Continued)

*Primary Examiner* — Chuong T Ho
(74) *Attorney, Agent, or Firm* — Crowell & Moring LLP

(57) ABSTRACT

This disclosure describes methods and systems for exchanging AI computing information for load prediction model between network elements of a wireless communication network. The methods include: sending, by a first network element of a wireless communication network, a first message for load prediction to a second network element of the wireless communication network, wherein the first message comprises at least one of an input to a machine learning model for load prediction of the first network element or model configuration information of the machine learning model.

20 Claims, 14 Drawing Sheets

(56) References Cited

U.S. PATENT DOCUMENTS

| | | | |
|---|---|---|---|
| 2022/0149980 A1* | 5/2022 | Skärby | G06N 3/08 |
| 2022/0295295 A1* | 9/2022 | Moosavi | H04W 24/08 |
| 2022/0330072 A1* | 10/2022 | Zeng | H04W 24/10 |
| 2022/0366494 A1* | 11/2022 | Cella | H04L 9/50 |

FOREIGN PATENT DOCUMENTS

| | | |
|---|---|---|
| CN | 110120882 A | 8/2019 |
| CN | 111083753 A | 4/2020 |
| WO | WO 2020/055172 A1 | 3/2020 |
| WO | WO 2020/074085 A1 | 4/2020 |

OTHER PUBLICATIONS

Gao et al., "Machine Learning based Energy Saving Scheme in Wireless Access Networks", 2020 International Wireless Communications and Mobile Computing (IWCMC) Conference, IEEE, Jun. 15, 2020, p. 1573-1578.

Polese et al., "Machine Learning at the Edge: A Data-Driven Architecture with Applications to 5G Cellular Networks," *IEEE Transactions on Mobile Computing,* vol. 20, Issue. 12, Jun. 4, 2020, p. 3367-3382.

Anonymous, "AI in Network Use Cases in China", GSMA, Oct. 2019 https://www.gsma.com/greater-china/wp-content/uploads/2019/10/AI-in-Network-Use-Cases-in-China.pdf, 156 pages.

International Search Report and Written Opinion for International Patent Application No. PCT/CN2020/109196 dated May 12, 2021, 8 pgs.

Office Action for Chinese Patent Application No. 202080097949.1 dated Aug. 19, 2024, 17 pages.

ZTE, "Artificial Intelligence based Energy Saving" 3GPP TSG RAN WG e-Meeting #88-e, RP-200781, Jun. 22, 2020, 5 pages.

ZTE, "Summary of Rel-17 email discussion on AI-based network," 3GPP TSG-RAN #86, RP-192579, Dec. 3, 2019, 7 pages.

Office Action for Indonesian Patent Application No. P00202206787 dated Nov. 21, 2024, w/English translation, 6 pages.

Chinese-language Office Action issuued in Chinese Application No. 202080097949.1 dated Feb. 20, 2025 with English translation (14 pages).

* cited by examiner

METHOD FOR AI BASED LOAD PREDICTION

CROSS REFERENCE

This application is a continuation of and claims priority to International Patent Application No. PCT/CN2020/109196, filed on Aug. 14, 2020, which is herein incorporated by reference in its entirety.

TECHNICAL FIELD

This disclosure is directed to exchanging Artificial Intelligence (AI) computing information for load prediction within a wireless communication network.

BACKGROUND

Self-optimization Network (SON) has become a key feature in mobile communication systems. In particular, automatic Mobility Load Balancing (MLB) is an important function in SON. For example, with MLB in cellular networks, the communication system may evenly distribute cell traffic load and offload mobile users from one cell to another. Such optimization aims at increasing the system capacity and reliability as well as improving user experience. In addition, this function is able to minimize human intervention in the network management and optimization tasks.

SUMMARY

This disclosure describes methods and systems for exchanging AI computing information between various network elements in a wireless communication systems.

In one example implementation, a method performed by a network element of a wireless communication system for exchanging AI computing information is disclosed. The method include sending, by a first network element of a wireless communication network, a first message for load prediction to a second network element of the wireless communication network, wherein the first message comprises at least one of an input to a machine learning model for load prediction of the first network element or model configuration information of the machine learning model.

In the implementation above, the input to the machine learning model includes at least one of: current load information of a current cell associated with and served by the first network element; current load information of a neighbor cell of the current cell; historical load information of the current cell; or historical load information of the neighbor cell.

In any one of the implementations above, the model configuration information of the machine learning model includes at least one of: a machine learning model type; an AI algorithm information; information of a hardware platform on which the machine learning model is run; or training configuration information of the machine learning model.

In any one of the implementations above, the machine learning model type includes at least one of: a time level model type; a spatial level model type; a historical level model type; or a resemble model type.

In any one of the implementations above, the AI algorithm information indicates at least one of: an Autoregressive Integrated Moving Average (ARIMA) algorithm; a Prophet model algorithm; a Random Forest algorithm; a Long Short Term Memory (LSTM) algorithm; or an Ensemble Learning algorithm.

In any one of the implementations above, the hardware platform information includes at least one of: a graphic processing unit (GPU) information; a field programmable Gate Array (FPGA) information; an application specific integrated circuit (ASIC) information; or a system on a chip (SoC) information.

In any one of the implementations above, the training configuration information includes at least one of: a gradient configuration; a weight configuration; a derivation configuration; or a size of training parameters of the machine learning model.

In any one of the implementations above, the first message includes one of: an Next-Generation Radio Access Network (NG-RAN) Node Configuration Update message; a Next generation nodeB Distribution Unit (gNB-DU) Configuration Update message; a Next generation nodeB Central Unit (gNB-CU) Configuration Update message; an EN-DC Configuration Update message; or an AI Configuration Update message.

Any one of the implementations above, further includes receiving, by the first network element, a response message to the first message from the second network element.

In any one of the implementations above, the response message includes one of: an NG-RAN Node Configuration Update Acknowledge message; an AI Configuration Update Acknowledge message; a gNB-DU Configuration Update Acknowledge message; a gNB-CU Configuration Update Acknowledge message; or an EN-DC Configuration Update Acknowledge message.

In any one of the implementations above, the first message includes a one-way AI Configuration Transfer message.

In any one of the implementations above, the first network element or the second network element includes a base station.

In any one of the implementations above, the base station includes at least one of: a New Generation NodeB (gNB); an Evolved NodeB (eNB); or a NodeB.

In any one of the implementations above, the first network element includes a Distribution Unit (DU) of a base station and the second network element includes a Central Unit (CU) of the base station.

In any one of the implementations above, the first network element includes a Central Unit (CU) of a base station and the second network element includes a Distribution Unit (DU) of the base station.

In any one of the implementations above, the first network element is configured to be a secondary node and the second network element is configured to be a master node, and the first network element and the second network element form a dual connectivity configuration.

Any one of the implementations above, further includes causing the second network element to adapt a machine learning model running on the second network element according to the AI computing information message.

Various network elements are further disclosed. Each of these network nodes includes a processor and a memory, wherein the processor is configured to read computer code from the memory to implement any one of the methods described above.

Non-transitory computer-readable media are further disclosed. Such a non-transitory computer-readable medium includes instructions which, when executed by a computer, cause the computer to carry out any one of the methods described above.

The above embodiments and other aspects and alternatives of their implementations are described in greater detail in the drawings, the descriptions, and the claims below.

DETAILED DESCRIPTION

The technology and examples of implementations and/or embodiments in this disclosure can be used to improve performance of Mobility Load Balancing (MLB) and to save energy in communication systems. The term "exemplary" is used to mean "an example of" and unless otherwise stated, does not imply an ideal or preferred example, implementation, or embodiment. The implementations may be embodied in a variety of different forms and, therefore, the scope of this disclosure or claimed subject matter is intended to be construed as not being limited to any of the embodiments set forth below. The various implementations may be embodied as methods, devices, components, or systems. Accordingly, embodiments of this disclosure may, for example, take the form of hardware, software, firmware or any combination thereof.

This disclosure relates to methods and systems for exchanging AI computing information for load prediction between network elements in a wireless communication system. In the implementations disclosed below, a network element is configured to perform load prediction based on one or more machine learning models. The network element disclosed below is further capable of adaptively configuring, updating, and optimizing the machine learning models based on AI computing or machine leaning model information acquired from a peer network element. The network element further uses the updated or optimized machine learning model to predict load in the network element. While the disclosure below is provided in the context of fourth generation (4G) and fifth generation (5G) cellular networks, the underlying principles of this disclosure are applicable to other wireless infrastructures, as well as wireline networks supporting load prediction and load balancing based on AI.

Figure 1:
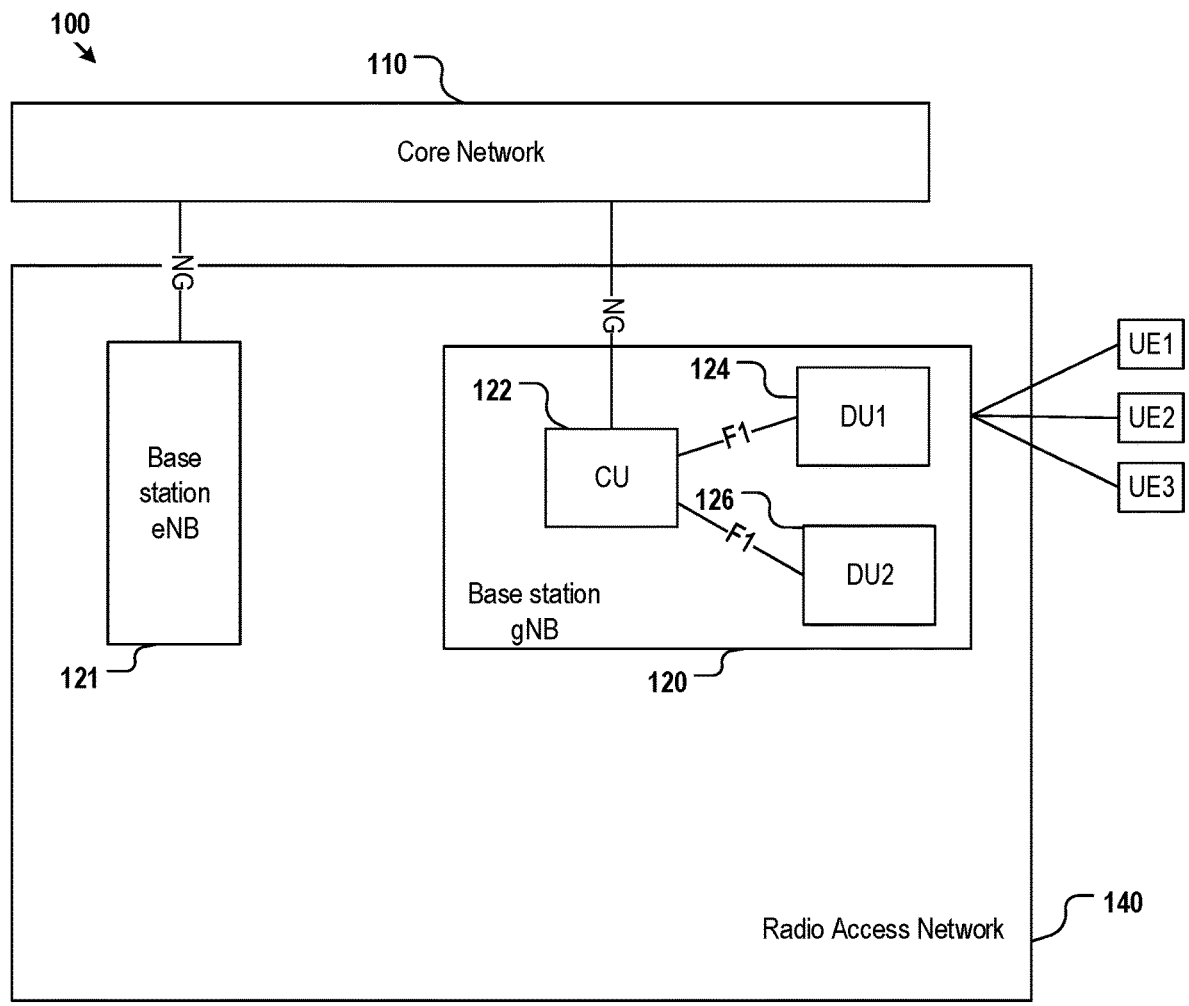
FIG. 1 illustrates an exemplary system diagram of a wireless communication network.

FIG. 1 illustrates an exemplary wireless communication network 100 including a plurality of user equipment (UEs) and a carrier network. The carrier network, for example, may further include at least one radio access network (RAN) 140 and one core network 110. The RAN 140 may be backhauled to the core network 110. The RAN 140 may include one or more various types of wireless base station (BS) or wireless access network nodes 120 and 121 including but not limited to Next Generation NodeB (gNB), en-gNB (a gNB capable of connecting to a 4G core network), evolved NodeB (eNodeB, or eNB), Next Generation eNB (ng-eNB), NodeB, or other type of base stations. The base stations may be connected with each other via communication interfaces such as X2, or Xn interface. The BS 120, for example, may further include multiple separate units in the form of a central unit (CU) 122 and at least one distributed unit (DU) 124 and 126. The CU 122 may be connected with DU1 124 and DU2 126 via various F1 interfaces. In some embodiments, the CU may include gNB central unit (gNB-CU), and the DU may include gNB distributed unit (gNB-DU). The wireless communication network 100, for example, may include various UEs that access the RAN 140 wirelessly. Each of the UEs may include but is not limited to a mobile phone, a smartphone, a tablet, a laptop computer, a vehicle on-board communication equipment, a roadside communication equipment, a sensor device, a smart appliance (such as a television, a refrigerator, and an oven), an MTC/eMTC device, an IoT device, or other devices that are capable of communicating wirelessly. The UEs may indirectly communicate with each other via the RAN 140 or via both the RAN 140 and the core network 110 or directly via sidelinks between the UEs.

For simplicity and clarity, only one RAN 140 is shown in the wireless communication network 100. It will be appreciated that one or more RANs 140 may exist in the wireless communication network system 100, and each RAN may include a plurality of base stations. Each base station may serve one or more UEs.

Load Balancing

In a wireless communication system, each base station supports various number of UEs and each UE may generate various amount of traffic at different time and different locations within the system. One important characteristic of the wireless communication system is the traffic load variations both in time and space. For example, a base station may experience different load at different time of a day, a different day of a week, or a different month of a year. For another example, the base station may experience higher load at a hot urban location, and lower load at a remote location. Different UE behavior may impact the base station load as well. For example, a UE in a voice call may generate low bandwidth traffic whereas a UE receiving a streaming video may generate high bandwidth traffic. Further, the traffic bandwidth may vary dramatically in the same application. For example, a UE may receive streaming video at significantly different bit rate at different times.

Due to the load variation, a base station may become busy, congested, or even overloaded when the capacity reaches the maximum designed capacity of the base station. When this happen, the Quality of Service (QoS) degrades and user experience is negatively impacted as a UE may lose connection to the network. In a base station overload situation, the base station may further need to reboot to recover from the overload condition, leading to service interruption in an area covered by the base station. On the other hand, a neighboring base station of the overloaded base station may be only lightly occupied and under-used. The spectrum resource and the hardware/software capacity allocated to the neighboring base station would be wasted. As such, load balancing is introduced to offload traffic or user from a busy base station to an under-used base station, to achieve a goal of balancing the load across the base stations.

Another benefit brought by the load balancing is energy efficiency. In a wireless communication system, it is possible to exploit the capacity of one base station by bringing in users from the neighboring base station and deactivate the neighboring base station to save energy. The neighboring base station may be activated later when load condition changes. The activation and deactivation may be applied to the base station in whole or partially.

To achieve load balancing, a base station monitors its load information in real time. The load information may include Physical Resource Block (PRB) usage, Transport Network Layer (TNL) capacity, hardware load, number of active UEs, Radio Resource Control (RRC) connections, and the like. The base station further exchanges load information with its neighboring base stations. Based on load information of the local base station and the neighboring base station, the base station may decide to offload some of its UEs to a neighboring base station. For example, in a situation that the base station is heavily loaded and the neighboring base station is lightly loaded, the base station may optimize the load distribution among base stations by offloading. In some implementations, one base station may take over the entire traffic of a neighboring base station so that the neighboring base station may be deactivated to save energy.

While the description above is provided in the context of load balancing in base stations, similar load balancing may also occur between cells of a same base station.

In addition to use real time load information to make load balancing decision, historical load information may also be taken into consideration. Furthermore, with the rapid progress of the AI technology, it is possible to predict the load information of a base station based on a deep learning model, using current load information and historical load information as input. With the predicted load information, the wireless communication system may be able to pre-select an appropriate mobility strategy and optimize the system performance in a proactive manner. For example, the system may be able to predict that for a certain base station, at a certain time, the traffic load may spike. The traffic load spike, for example, may occur during at some predictable time frames. The system may then be able to pre-allocate more communication resources, such as transport resources, to the base station.

While the description above is provided in the context of base stations, the load balancing principle in general may also be applied to other network elements in a communication system.

Load Information Prediction with AI

The operation of AI computing may be performed locally in the base station. For example, the base station may be configured with an AI computing related module assigned for the AI tasks. The AI computing may also be performed outside the based station, for example, by an AI server or a server cluster outside the base station, such as a cloud based AI server or server cluster. At least one Machine Learning (ML) load prediction model may be deployed for the AI computing. In particular, the ML load prediction model may be pre-trained, and may be re-trained after deployment. When there are multiple ML load prediction models deployed, the base station may be configured to choose a model to perform load prediction based on a certain requirement.

Certain information is required for the operation of the AI computing and such AI computing information includes input to the ML load prediction model and the related ML load prediction model configuration information. Details are described below.

Figure 2:
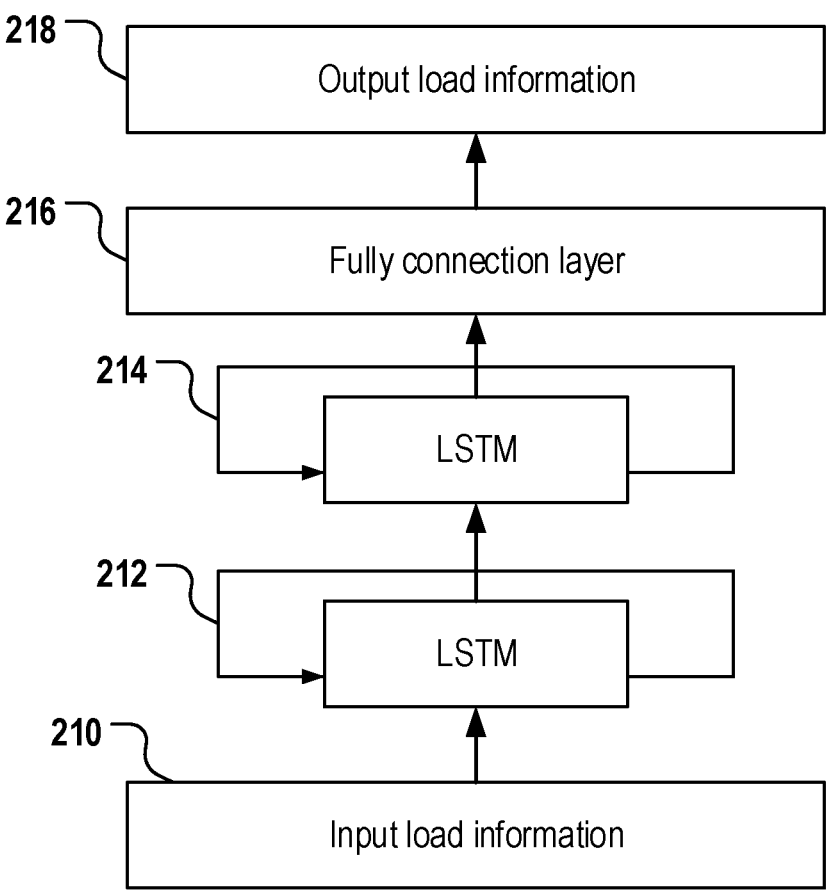
FIG. 2 illustrates an exemplary machine learning model for load prediction.

FIG. 2 shows an exemplary ML load prediction model using the Long Short Term Memory (LSTM) algorithm. The model may be configured as a Recurrent Neural Network (RNN). The input load information 210 is the input to the ML load prediction model. There are two LSTM networks 212 and 214. A fully connection layer 216 takes input from the LSTM network 214, and generate the predicted load information 218 as the output. Alternatively to FIG. 2, the ML load prediction model may also be configured as a Convolutional Neural Network (CNN), or any other types of neural network.

The input to the ML load prediction model includes at least one of: the current load information of a current cell; the current load information of a neighbor cell; the historical load information of current cell at previous times; the historical load information of a neighbor cell at previous times. The historical load information may be load information of a previous hour, day, week, month, year, or the like, and there is no limitation imposed in this disclosure.

The ML load prediction model may include at least one of a temporal level (or time level) model, a spatial level model, a historical level model and a resemble model. For example, the time level model predicts the load information from a time perspective, which includes a trend of the base station traffic. The time level model may apply the Seasonal Autoregressive Integrated Moving Average (SARIMA) as the modeling algorithm, and use the load information at previous times as the input. For another example, the spatial level model predicts the load information from the spatial perspective, such as the physical location of a cell, or the physical location of a sub-cell obtained by dividing the cell based on a predefined pattern. The spatial level model may be a linear regression model, using the load information of current cell and neighbor cells at current time as the input. For another example, the historical level model may be used to capture the residual based on historical pattern of the base station traffic load. The historical level model may be a regression tree model, using the load information of current cell at previous times and the load information of neighbor cells at current time as the input. In some implementations, the ML load prediction model may further be implemented as a cascaded model by serially connecting various models together, to exploit different benefits brought by different type of models.

The ML load prediction model configuration information (alternatively referred to as ML load prediction model information) may include at least one of: AI algorithm information, information with respect to hardware platform on which the ML load prediction model is run, or training information of the ML load prediction model.

The AI algorithm information identifies the algorithm used by the ML load prediction model and the AI algorithm as indicated may include at least one of: an Autoregressive Integrated Moving Average (ARIMA) model, a Prophet model, a Random Forest model, a Long Short Term Memory (LSTM) model, or an Ensemble Learning model. As an example, in some implementations, the ARIMA model may be used to learn and predict time based load pattern, as the ARIMA model performs well for time series forecasting. The Random Forest model may be used to learn and predict spatial based load pattern. The Ensemble Learning model may be used to combine predictions from multiple models to reduce variance as well as achieve a better prediction result. Other algorithms are also contemplated.

The ML load prediction model may run on various hardware platforms. The hardware platform may include Graphic Processing Unit (GPU), Field Programmable Gate Array (FPGA), Application Specific Integrated Circuit (ASIC), and system on a chip (SoC). Different hardware platform may have different computation power and present different performance characteristics. The hardware platform of choice is indicated by the hardware platform information included in the ML load prediction model information.

The training information of the ML load prediction model may include: gradient parameter information, weight parameter information, or derivation/bias parameter information. These information may indicate the size of the ML model. For example, the weight parameter or bias parameter information may indicate the number of weights and bias of the model. The gradient parameter may minimize the loss function of the model.

AI Computing Information Exchange

A base station may use the AI based load prediction model to predict a future load of the base station to facilitate more efficient and robust network resource management and improve network performance. As the network traffic or load is distributed across base stations and other network elements in a wireless communication system, also due to the mobility nature of the wireless traffic, the load on different base stations may be correlated. As such, the load prediction may not be achieved in isolation, i.e., the load prediction may not be restricted to the scope of just a single base station. When a base station performs AI based load prediction, the base station not only needs to have access to information local to the base station, but also need to be informed on neighboring base station load information. When the AI based load prediction is performed, the load condition on other base stations, such as neighboring base station has to be taken into consideration, so the load prediction may be conducted in a system level.

In addition to exchange current load information, the base stations may further exchange and share predicted load information with each other. To achieve a precise and optimal load balancing decision, base stations may need to apply consistent rules when evaluating or predicting load information. It is critical the current and predicted load information are derived in a same or similar manner and follow same principle. Otherwise, for example, a load information result generated in one base station based on one load prediction policy may not be interpreted properly by another base station using a different prediction policy, and this will negatively impact the prediction result.

In particular, when applying AI computing to load prediction, the AI computing configuration information described earlier in this disclosure is a major factor contributing to the prediction output. For example, different input to the ML prediction model may lead to different load prediction output. In addition, even using a same input, different type of ML prediction model may generate different load prediction output. For example, different types of models such as the temporal level model, the spatial level model, the historical level model, and the resemble model may be chosen to capture different input characteristics and they may generate different prediction result. Similarly, ML prediction models based on different AI algorithms may generate different load prediction output. For example, some algorithms may focus on capturing temporal characteristics, whereas some other algorithms may focus on capturing spatial characteristics. For another example, some algorithms may keep a long-term memory whereas some other algorithms may keep a short-term memory on history events. Furthermore, even for AI load prediction using same type of model and same AI algorithm, configuration of certain parameters of the ML prediction model, such as weight, bias, and gradient configuration, may have a direct impact on the load prediction output.

In a wireless communication system, networks elements including base stations may be developed and manufactured by different vendors. Even these networks elements follow same standards, it is a common practice for different vendors to use different implementations on a standard based feature or function. Base stations from different vendors need to collaborate and support inter-operability with each other. To support mobility load balancing, base stations from different vendors need to exchange information including load prediction information with each other. These base stations may be developed separately by their respective vendors using different software and hardware. As such, each vendor may have its own development strategy and design choice on AI load prediction. For example, the type of ML load prediction model may be different, and the AI algorithm for the ML load prediction model may also be different. In addition, the dataset used to train the ML load prediction model, the parameters of the ML load prediction model, and the hardware platform used to train and deploy the ML load prediction model may also be different. With these different design choices, it is expected that the load prediction information generated by the base stations from different vendors presents a large variation or inconsistency. Such variation and inconsistency may lead to a sub-optimal load balancing decision in a base station.

It is to be understood that, for certain type of base stations, such as gNB, it may include different units, such as a CU and at least one DU. In this architecture, the CU and the DU may be developed by different vendors. In particular, the CU and the DU may both deploy at least one ML load prediction model of their own choice and compute load prediction information separately, and the load prediction result may also be impacted by the AI computing information.

As one solution to solving the aforementioned issue caused by inconsistent AI computing information, the AI computing information may be exchanged between various network elements, such as based stations, CU and DU, and the like, where the ML load prediction models are deployed. Once a network element receives the AI computing information from another network element, the network element may analyze the received AI computing information to obtain the configuration and status information of the ML load prediction model running on the other network element (alternatively referred to as a peer, or a peer network element). The network element may be able to update its own ML load prediction model based on the AI computing information received, for example, by re-training its own ML load prediction model. Alternatively, it may adjust certain parameters of the ML load prediction model based on the AI computing information received. In some implementations, there may be multiple ML load prediction models deployed in the network element and the network element may choose one of the models that match the received AI computing information the best. By following and matching the received AI computing information, the ML load prediction model running on the network element tends to be more consistent with the ML load prediction model running on the peer. As such, the load prediction results become more consistent. The various embodiments described below provide implementation of AI computing information exchange for solving the AI computing information inconsistency.

Embodiment 1

In this embodiment of this disclosure, a method for exchanging AI computing information between base stations is disclosed. Each of the base stations may include one of a gNB, an eNB, a NodeB, or any other type of transmitting and receiving stations.

Figure 3:
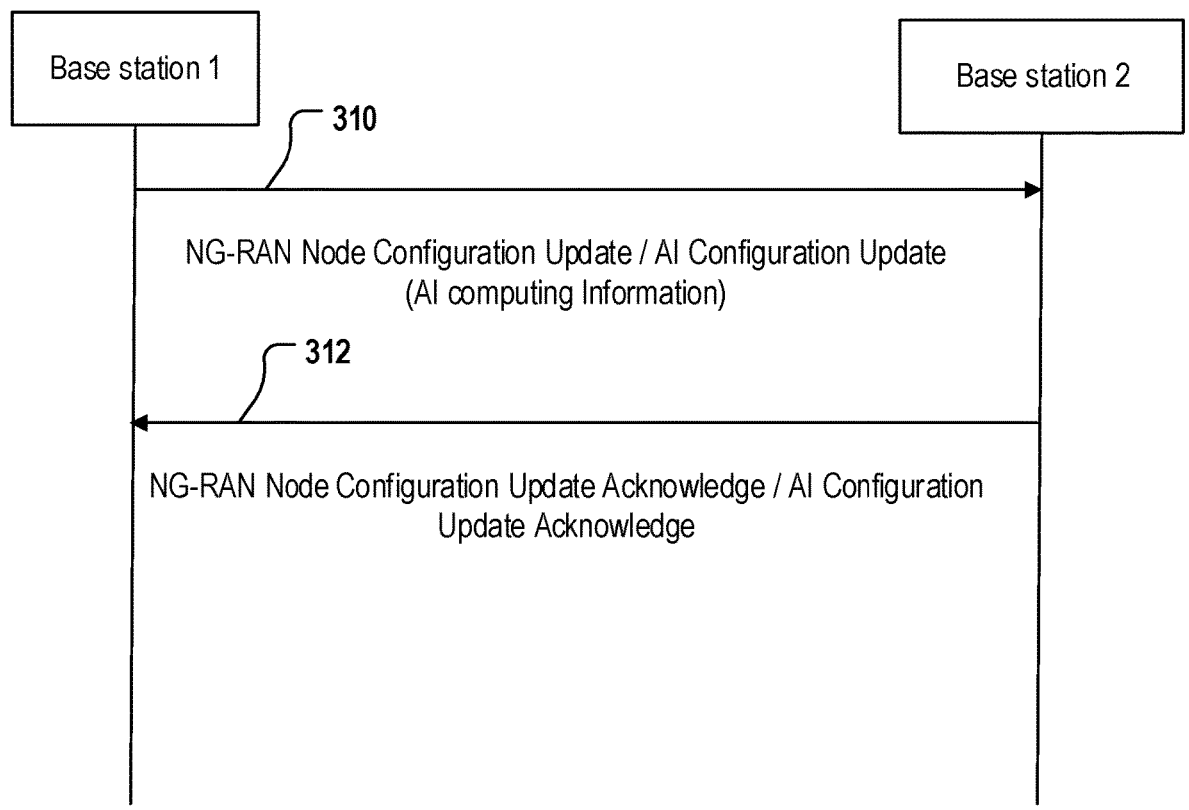
FIG. 3 illustrates a message flow for exchanging AI computing information between base stations.

Referring to FIG. 3, base station 1 may send AI computing information to base station 2 with a message 310. The message 310 may include a general purpose configuration update message between the base stations, such as a NG-RAN Node Configuration Update message, or a dedicated message serving the AI configuration update purpose, for example, an AI Configuration Update message.

As described earlier, the AI computing information includes input to the ML load prediction model and the related ML load prediction model configuration information.

The input to the ML load prediction model may include at least one of:
Current load information of a current cell;
Current load information of a neighbor cell;
Historical load information of a current cell at previous times; or
Historical load information of a neighbor cell at previous time.

The historical load information may include but is not limited to load information of a previous hour, day, week, month, or year.

The ML load prediction model information may include at least one of:
Model type information;
AI algorithm information;
Hardware platform information; or
Training configuration information.

The model type information may include information indicating at least one of:
a Temporal (time) level model;
a Spatial level model;
a Historical level model; or
a Resemble model.

The AI algorithm information may include information to indicate AI algorithm including at least one of:
an ARIMA model algorithm;
a Prophet model algorithm;
a Random Forest algorithm;
a LSTM algorithm; or
an Ensemble Learning algorithm.

The hardware platform information may include at least one of:
GPU information;
FPGA information;
ASIC information; or
SoC information.

The Training configuration information may include at least one of:
a gradient parameter information;
a weight parameter information;
a derivation/bias parameter information; or
a size of training parameters of the machine learning model.

After the base station 2 received the message 310 containing the AI computing information, base station 2 may re-train or update its own ML load prediction model based on the received AI computing information. In some implementation, there may be multiple ML load prediction models deployed in the base station 2, and the base station 2 may choose to use the model that matches the AI computing information the best.

The base station 2 may send a corresponding acknowledge message 312 to the base station 1 as a confirmation. The message 312 may include a general purpose configuration update acknowledge message between the base stations, such as a NG-RAN Node Configuration Update Acknowledge message, or a dedicated message, for example, an AI Configuration Update Acknowledge message.

In particular, the messages described above may be sent via an X2 or Xn interface.

Figure 4:
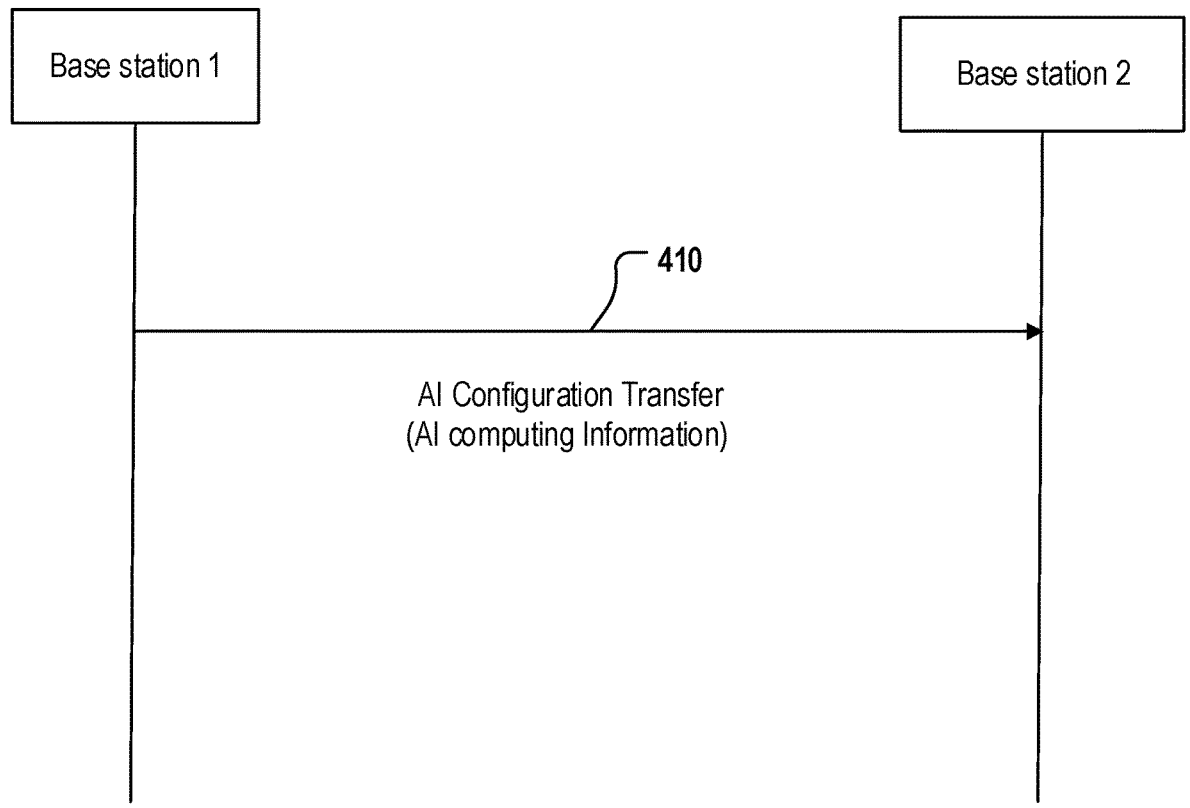
FIG. 4 illustrates another message flow for exchanging AI computing information between base stations.

FIG. 4 illustrates another implementation for exchange AI computing information between base station 1 and base station 2. In this implementation, a dedicated message 410 is sent from the base station 1 to the base station 2. For example, the message 410 may include an AI Configuration Transfer message. The message 410 may be a one-way message and as such, there may be no acknowledge message sent back to the base station 1.

Embodiment 2

In this embodiment of this disclosure, a method for exchanging AI computing information between DU and CU is disclosed.

As described earlier, a gNB may include a central unit (CU) and at least one distributed unit (DU). The CU and the DU may be connected via an F1 interface. ACU and a DU in a gNB may be referred to as a gNB-CU and a gNB-DU, respectively. Alternatively, an eNB capable of connecting to the 5G network may also be similarly divided into a CU and at least one DU, referred to as an ng-eNB-CU and an ng-eNB-DU, respectively. The ng-eNB-CU and the ng-eNB-DU may be connected via a W1 interface. In this embodiment, a DU may include at least one of a gNB-DU or an ng-eNB-DU, and a CU may include at least one of a gNB-CU or an ng-eNB-CU.

Figure 5:
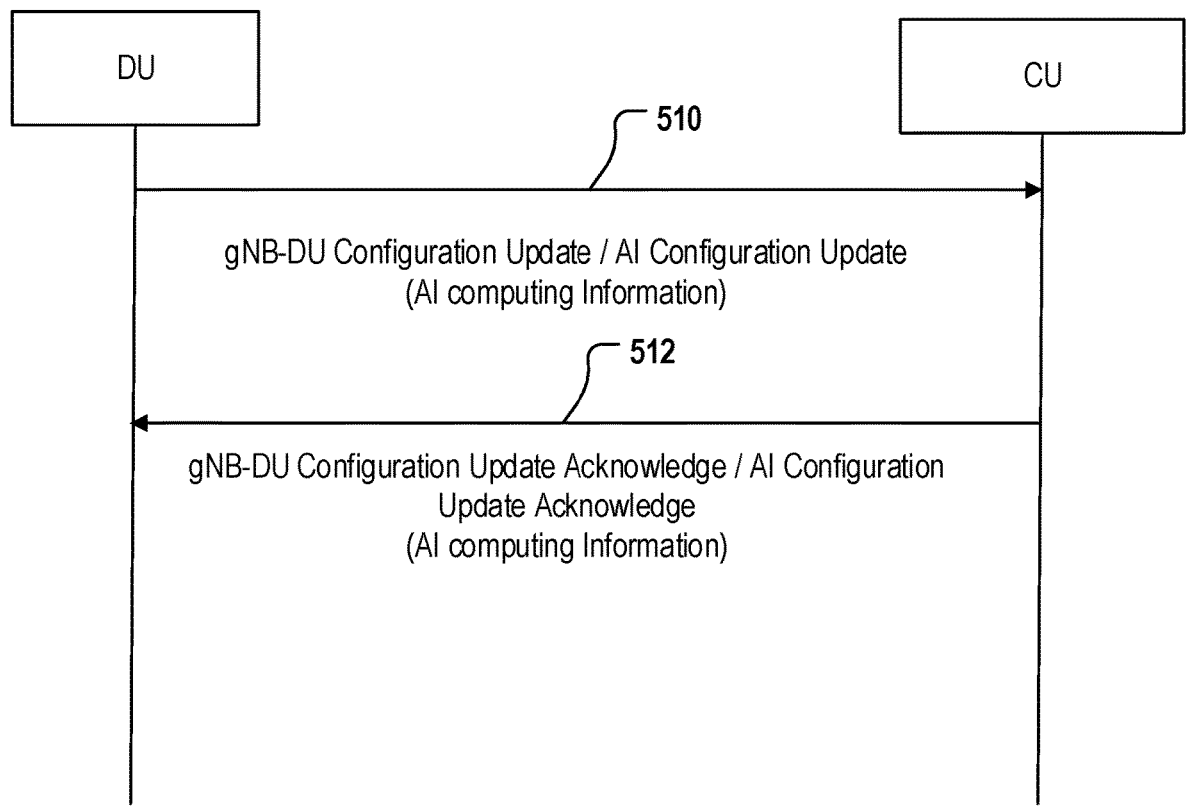
FIG. 5 illustrates a message flow for sending AI computing information from a DU to a CU.

Referring to FIG. 5, the DU may send AI computing information to the CU with a message 510. The message 510 may include a general purpose configuration update message between the DU and the CU, such as a gNB-DU Configuration Update message, or a dedicated message serving the AI configuration update purpose, e.g., an AI Configuration Update message. Details about the AI computing information is described in embodiment 1 and is not repeated here.

The CU may send a corresponding acknowledge message 512 to the DU as a confirmation. The message 512 may include a general purpose configuration update acknowledge message between the CU and the DU such as a gNB-DU Configuration Update Acknowledge message, or a dedicated message such as an AI Configuration Update Acknowledge message.

In particular, the messages described above may be sent via an F1 or W1 interface.

Figure 6:
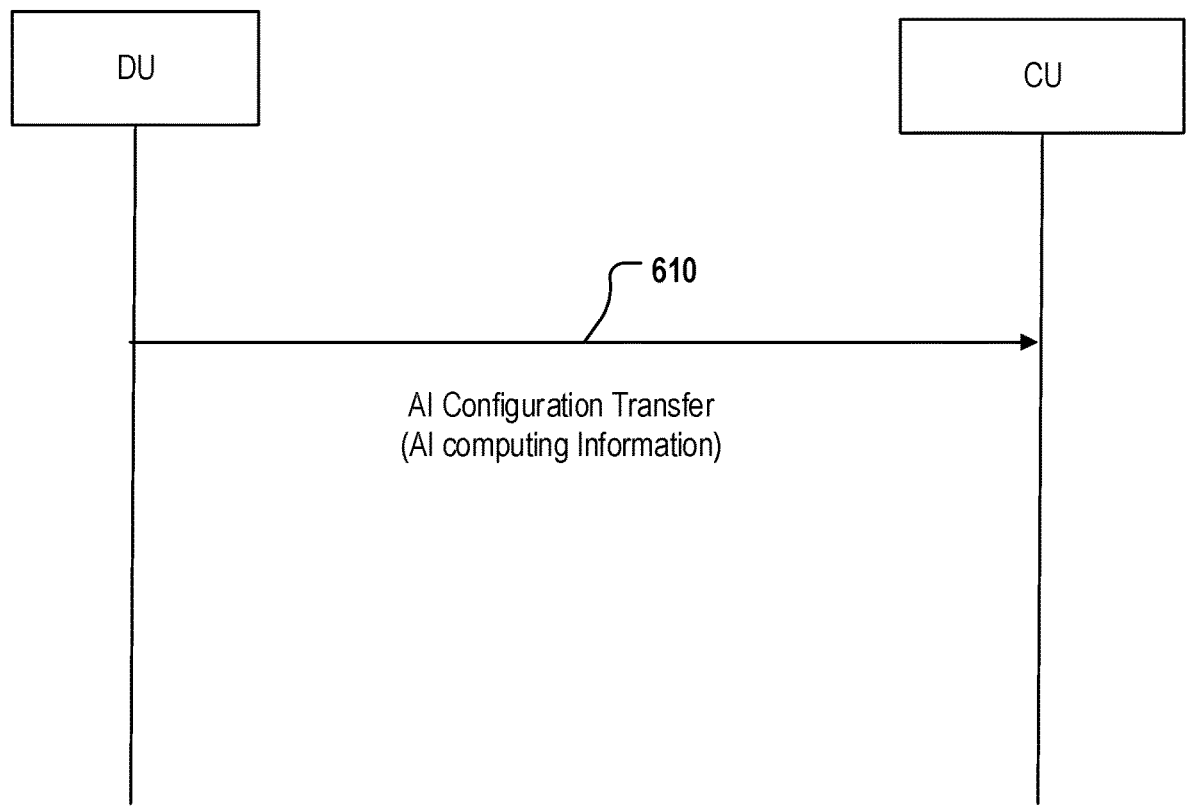
FIG. 6 illustrates another message flow for sending AI computing information from a DU to a CU.

FIG. 6 illustrates another implementation for sending AI computing information from the DU to the CU. In this implementation, a dedicated message 610, is sent from the DU to the CU. For example, the message 610 may include an AI Configuration Transfer message. The message 610 may be a one-way message and there may be no acknowledge message sent back to the DU.

Figure 7:
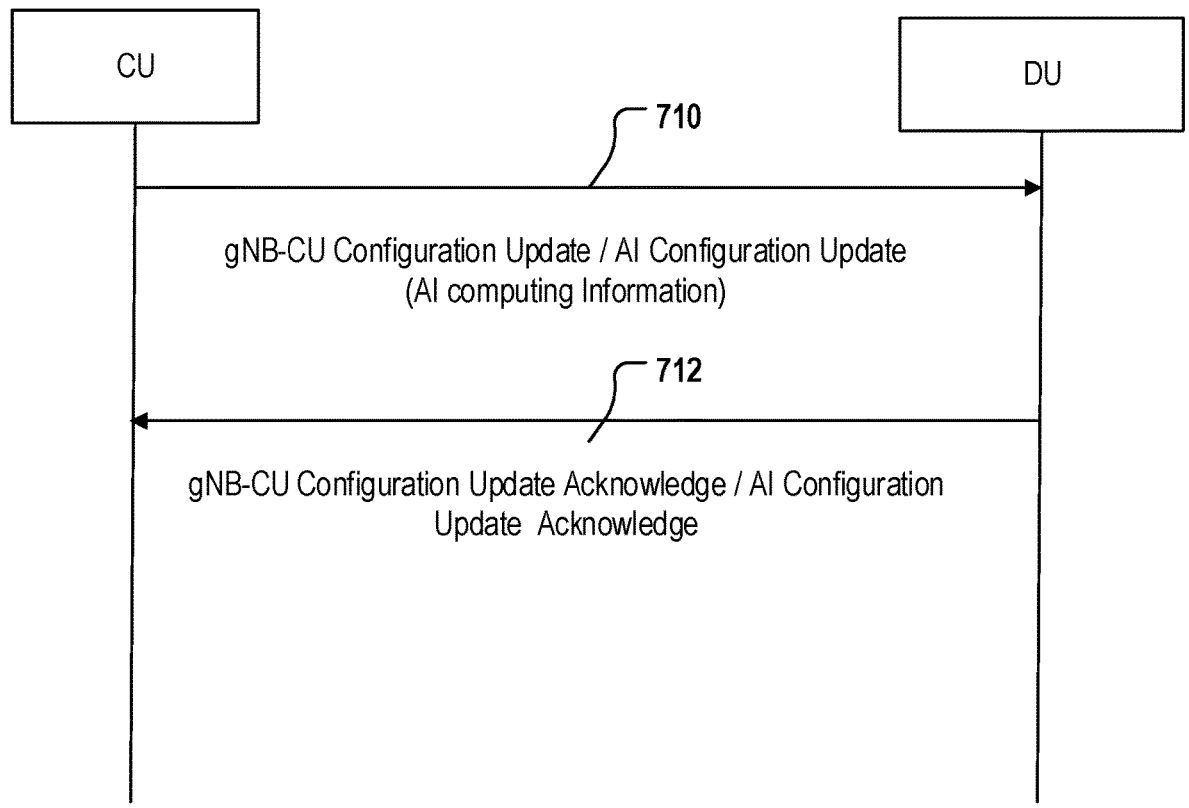
FIG. 7 illustrates a message flow for sending AI computing information from a CU to a DU.

Similarly, the AI computing information may be sent from the CU to the DU. Referring to FIG. 7, the DU may send AI computing information to the CU with a message 710. The message 710 may include a general purpose configuration update message between the CU and the DU such as a gNB-CU Configuration Update message, or a dedicated message serving the AI configuration update purpose such as an AI Configuration Update message. Details about the AI computing information is described in embodiment 1 and is not repeated here.

The DU may send a corresponding acknowledge message 712 to the CU as a confirmation. The message 712 may include a general purpose configuration update acknowledge message between the DU and the CU such as a gNB-CU Configuration Update Acknowledge message, or a dedicated message such as an AI Configuration Update Acknowledge message.

In particular, the messages described above may be sent via an F1 or W1 interface.

Figure 8:
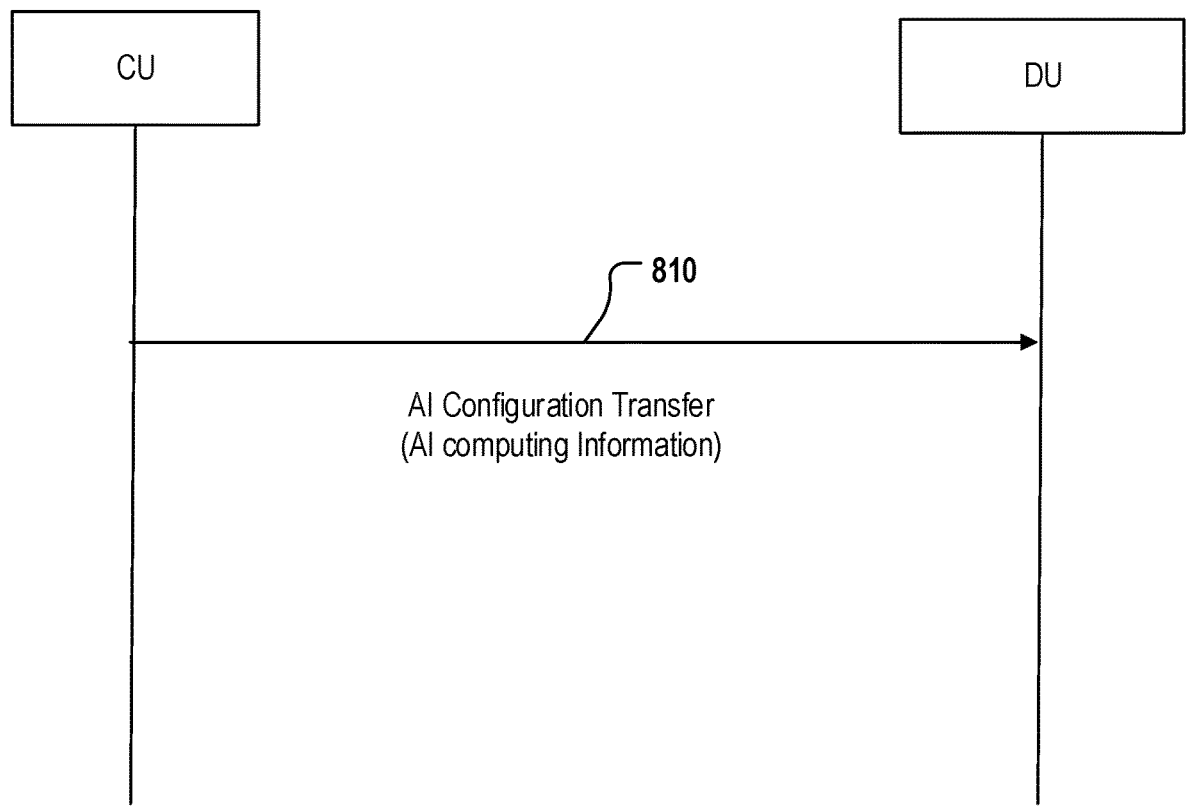
FIG. 8 illustrates another message flow for sending AI computing information from a CU to a DU.

FIG. 8 illustrates another implementation for sending AI computing information from the CU to the DU. In this implementation, a dedicated message 810 is sent from the CU to the DU. For example, the message 810 may include an AI Configuration Transfer message. The message 810 may be a one-way message and there may be no acknowledge message sent back to the CU.

Embodiment 3

In this embodiment of this disclosure, a method for exchanging AI computing information between a secondary node and a master node is disclosed.

Figure 9:
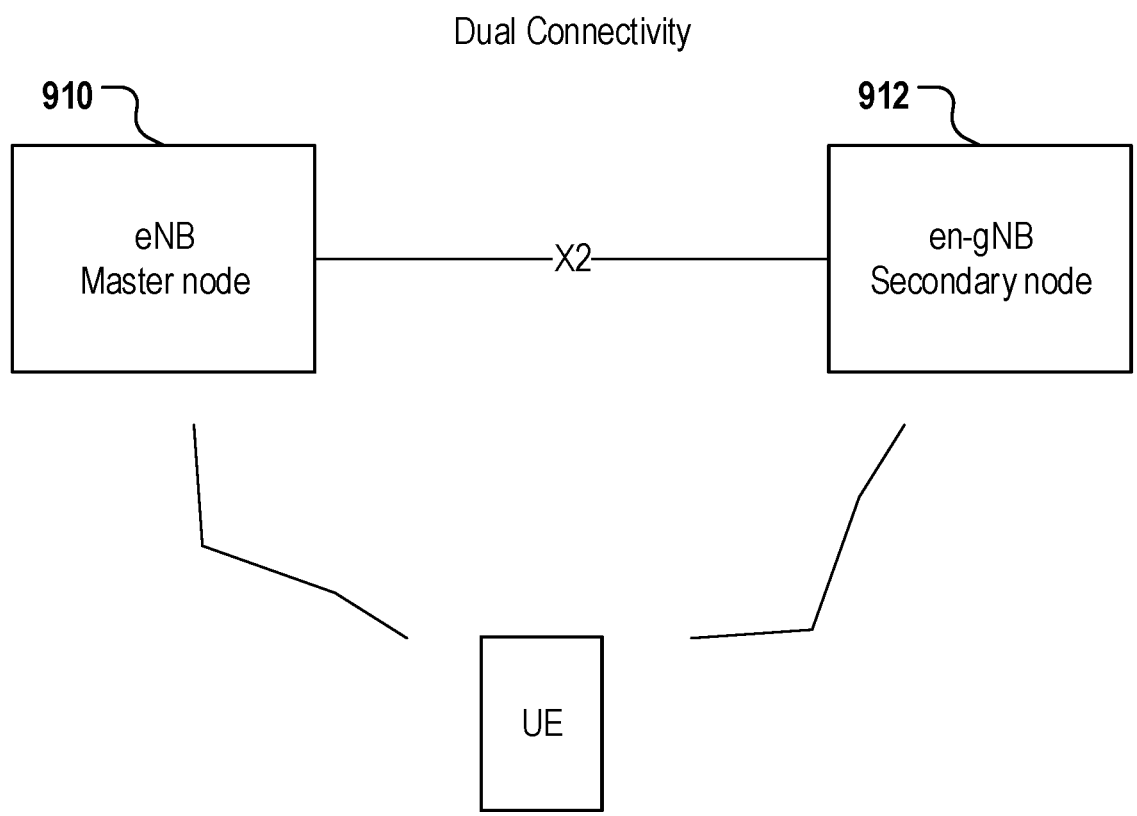
FIG. 9 illustrates an exemplary dual connectivity architecture with a master node and a secondary node.

As one New Radio (NR) deployment options, an LTE eNB may function as a master node, and an en-gNB may function as a secondary node to form an architecture referred to as Dual Connectivity. Referring to FIG. 9 as an example, a UE may communicate with both the master node 910 and the secondary node 912 in this architecture.

Figure 10:
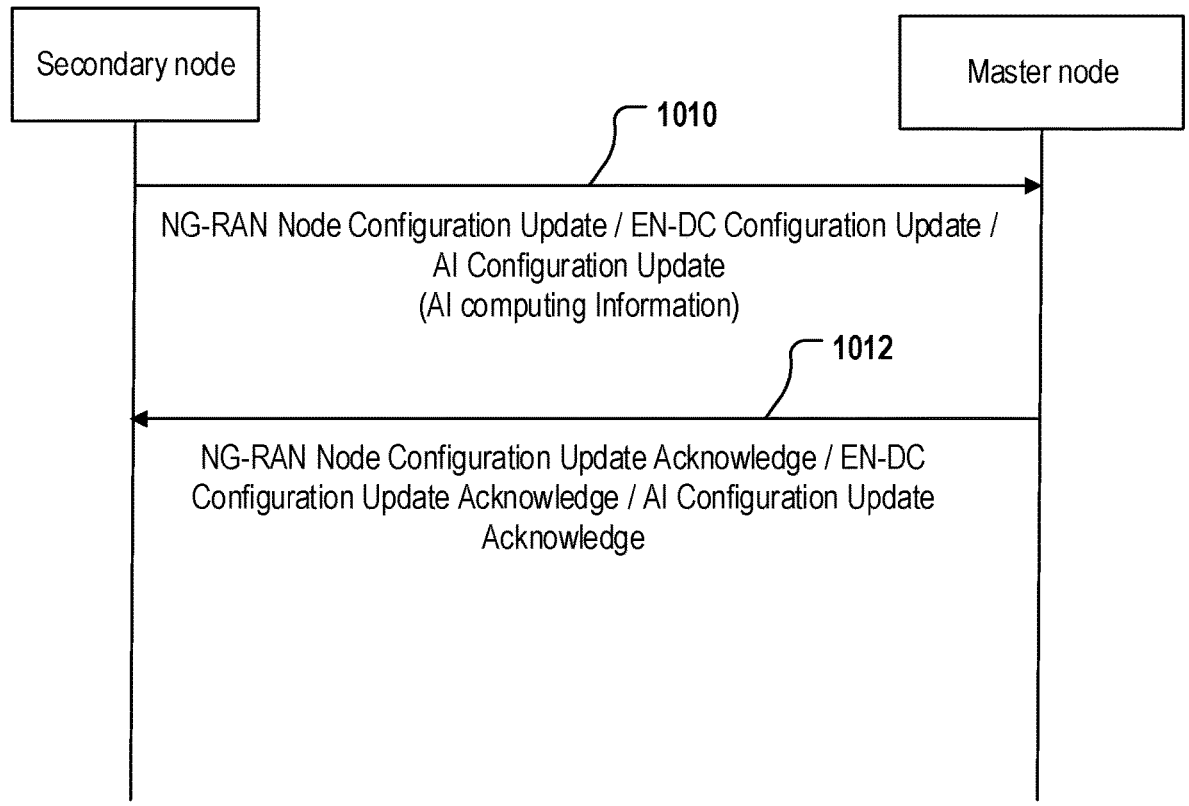
FIG. 10 illustrates a message flow for sending AI computing information from a secondary node to a master node.

Referring to FIG. 10, the secondary node may send AI computing information to the master node with a message 1010. The message 1010 may include a general purpose configuration update message between the base stations, such as an NG-RAN Node Configuration Update message, or a general purpose configuration update message between the secondary node and the master node, such as an EN-DC Configuration Update message, or a dedicated message serving the AI configuration update purpose, such as an AI Configuration Update message.

The master node may send a corresponding acknowledge message 1012 to the DU as a confirmation. The message 1012 may include a general purpose configuration update acknowledge message between the base stations, such as a NG-RAN Node Configuration Update Acknowledge message, or a general purpose configuration update message between the secondary node and the master node, such as an EN-DC Configuration Update Acknowledge message, or a dedicated message, such as an AI Configuration Update Acknowledge message.

In particular, the messages described above may be sent via an X2 interface.

Figure 11:
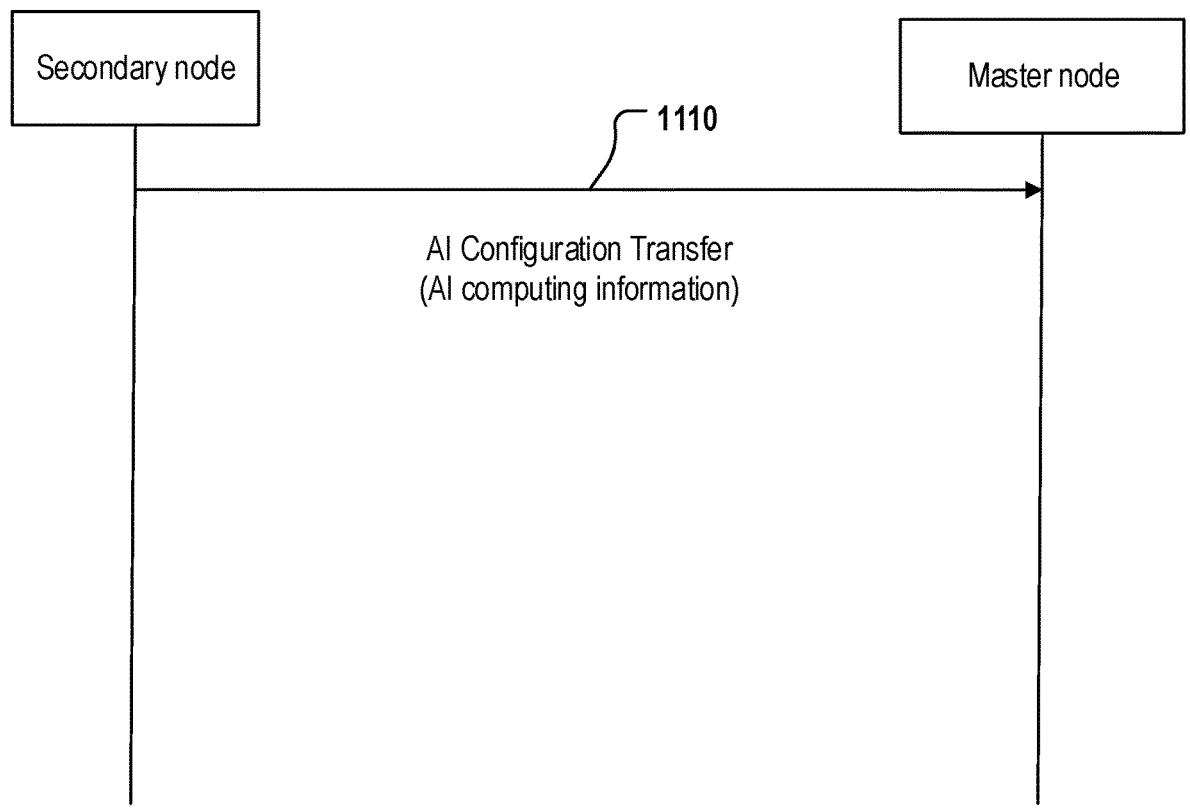
FIG. 11 illustrates another message flow for sending AI computing information from a secondary node to a master node.

FIG. 11 illustrates another implementation for sending AI computing information from the secondary node to the master node. In this implementation, a dedicated message 1110 is sent from the secondary node to the master node. For example, the message 1110 may include an AI Configuration Transfer message. The message 1110 may be a one-way message and there may be no acknowledge message sent back to the secondary node.

Figure 12:
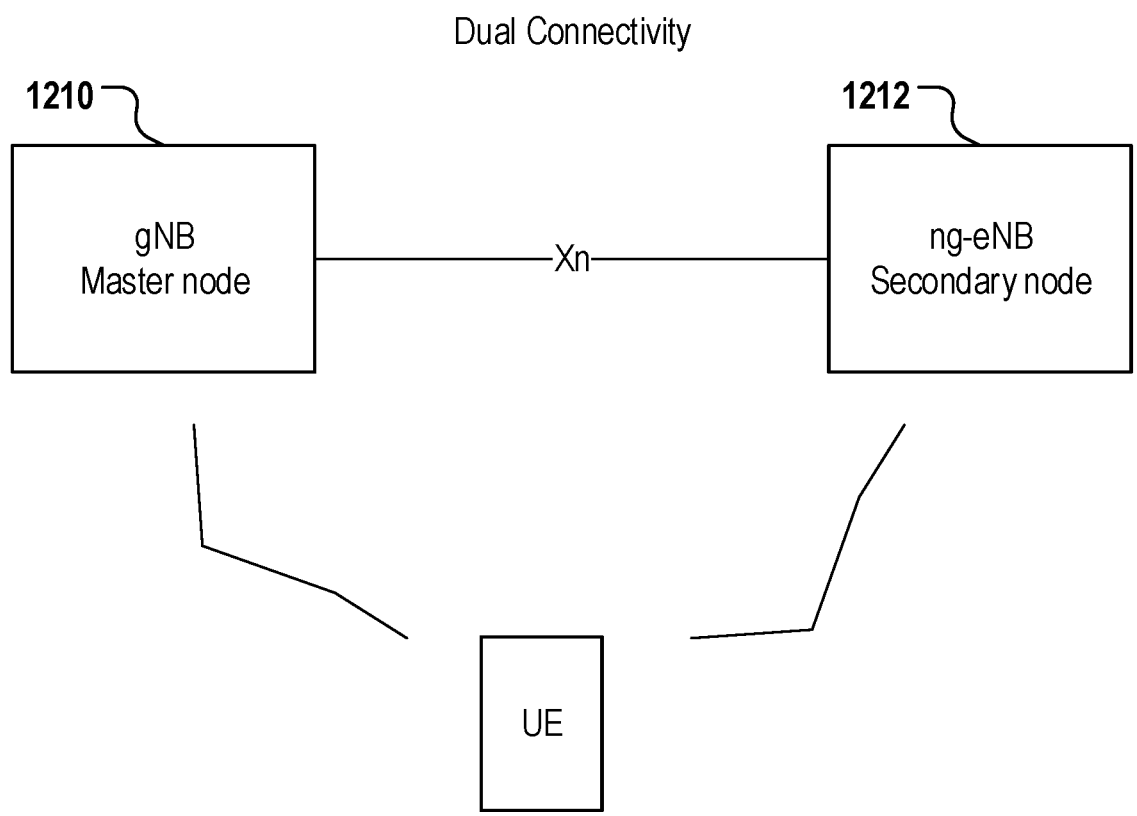
FIG. 12 illustrates another exemplary dual connectivity architecture with a master node and a secondary node.
Figure 13:
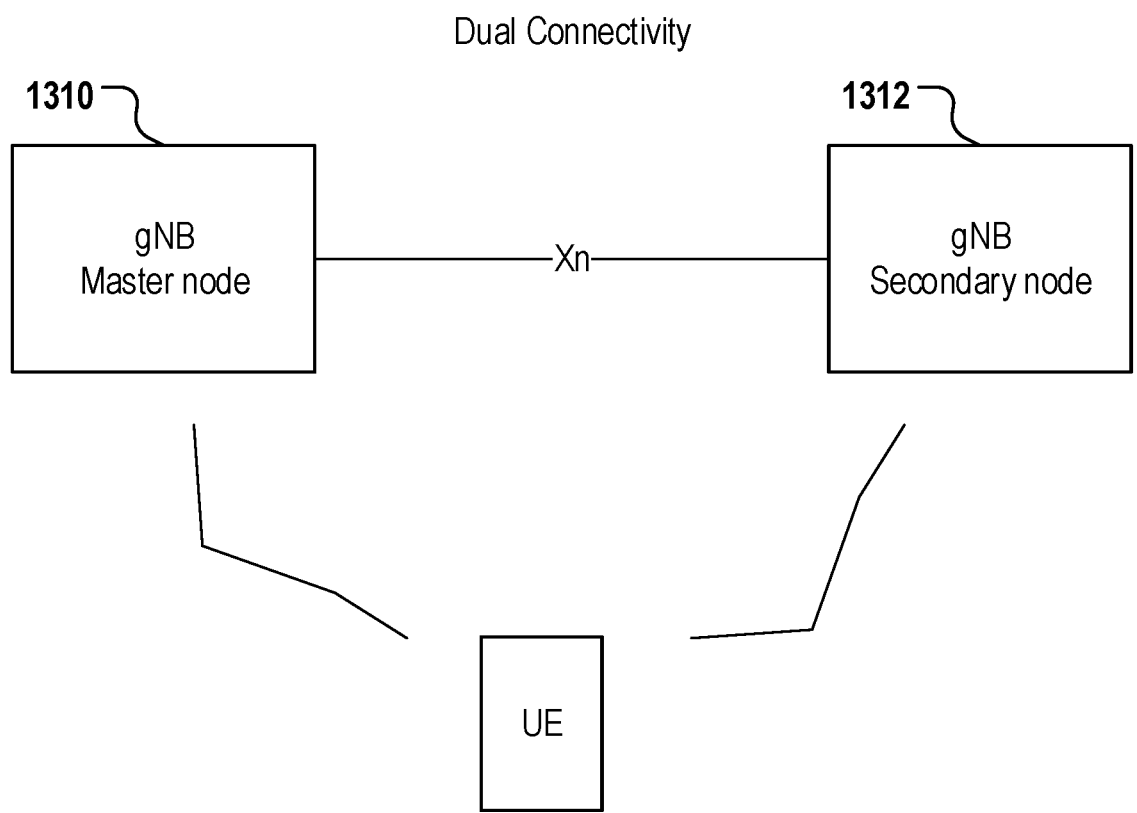
FIG. 13 illustrates another exemplary dual connectivity architecture with a master node and a secondary node.
Figure 14:
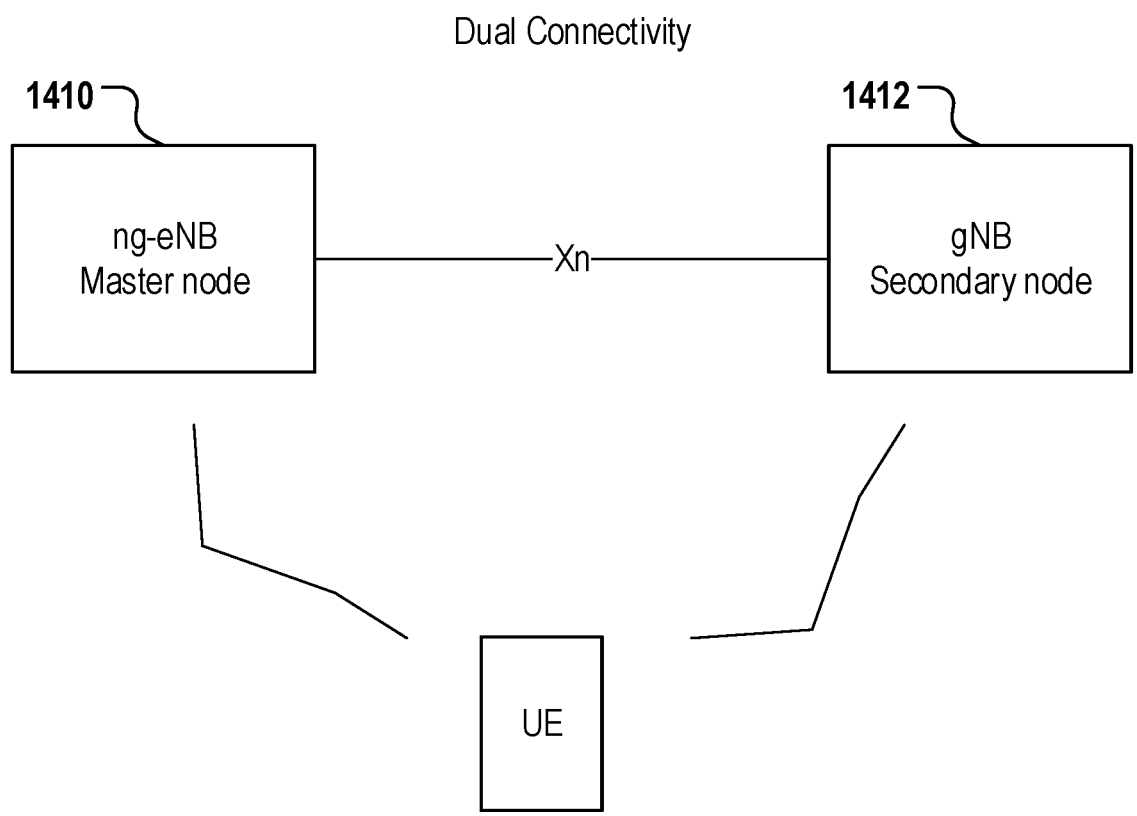
FIG. 14 illustrates another exemplary dual connectivity architecture with a master node and a secondary node.

While the description above is provided in the context of EN-DC dual connectivity, the same principle in general may also be applied to any other types of dual connectivity in a communication system. For example, as shown in FIG. 12, a dual connectivity with gNB 1210 as the master node and an ng-eNB 1212 as the secondary node. For another example, as shown in FIG. 13, a dual connectivity with a gNB 1310 as the master node and another gNB 1312 as the secondary node. For another example, as shown in FIG. 14, a dual connectivity with an ng-eNB 1410 as the master node and a gNB 1412 as the secondary node.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for Artificial Intelligence (AI) computing information exchanging, comprising:
   sending, by a first network element of a wireless communication network, a first message for load prediction to a second network element of the wireless communication network, wherein the first message comprises at least one of an input to a machine learning model for load prediction of the first network element or model configuration information of the machine learning model, wherein the input to the machine learning model comprises at least one of:
   current load information of a current cell associated with and served by the first network element;
   current load information of a neighbor cell of the current cell;
   historical load information of the current cell; or
   historical load information of the neighbor cell;
   wherein the first message comprises one of:
   a Next-Generation Radio Access Network (NG-RAN) Node Configuration Update message;
   a Next generation nodeB Distribution Unit (gNB-DU) Configuration Update message;
   a Next generation nodeB Central Unit (gNB-CU) Configuration Update message;
   an EN-DC Configuration Update message; or
   an AI Configuration Update message; and
   wherein the model configuration information of the machine learning model comprises a machine learning model type, and wherein the machine learning model type comprises at least one of:
   a time level model type;
   a spatial level model type;
   a historical level model type; or
   a resemble model type.

2. The method of claim 1, wherein the model configuration information of the machine learning model further comprises at least one of:
   an AI algorithm information;
   information of a hardware platform on which the machine learning model is run; or
   training configuration information of the machine learning model.

3. The method of claim 2, wherein the AI algorithm information indicates at least one of:
   an Autoregressive Integrated Moving Average (ARIMA) algorithm;
   a Prophet model algorithm;
   a Random Forest algorithm;
   a Long Short Term Memory (LSTM) algorithm; or
   an Ensemble Learning algorithm.

4. The method of claim 2, wherein the hardware platform information comprises at least one of:
   a graphic processing unit (GPU) information;
   a field programmable Gate Array (FPGA) information;
   an application specific integrated circuit (ASIC) information; or
   a system on a chip (SoC) information.

5. The method of claim 2, wherein the training configuration information comprises at least one of:
   a gradient configuration;
   a weight configuration;
   a derivation configuration; or
   a size of training parameters of the machine learning model.

6. The method of claim 1, further comprising:
   receiving, by the first network element, a response message to the first message from the second network element.

7. The method of claim 6, wherein the response message comprises one of:
   a NG-RAN Node Configuration Update Acknowledge message;
   an AI Configuration Update Acknowledge message;
   a gNB-DU Configuration Update Acknowledge message;
   a gNB-CU Configuration Update Acknowledge message; or
   an EN-DC Configuration Update Acknowledge message.

8. The method of claim 1, wherein the first message comprises a one-way AI Configuration Transfer message.

9. The method of claim 1, wherein the first network element or the second network element comprises a base station.

10. The method of claim 9, wherein the base station comprises at least one of:
    a New Generation NodeB (gNB);
    an Evolved NodeB (eNB); or
    a NodeB.

11. The method of claim 1, wherein the first network element comprises a Distribution Unit (DU) of a base station and the second network element comprises a Central Unit (CU) of the base station.

12. The method of claim 1, wherein the first network element comprises a Central Unit (CU) of a base station and the second network element comprises a Distribution Unit (DU) of the base station.

13. The method of claim 1, wherein the first network element is configured to be a secondary node and the second network element is configured to be a master node, and wherein the first network element and the second network element form a dual connectivity configuration.

14. The method of claim 1, further comprising causing the second network element to adapt a machine learning model running on the second network element according to the AI computing information message.

15. A first network element comprising one or more processors and one or more memories, wherein the one or more processors are configured to read computer code from the one or more memories to:
   send a first message for load prediction to a second network element, wherein the first message comprises at least one of an input to a machine learning model for load prediction of the first network element or model configuration information of the machine learning model;
   receive a response message to the first message from the second network element;
   wherein the input to the machine learning model comprises at least one of:
   current load information of a current cell associated with and served by the first network element;

current load information of a neighbor cell of the current cell;
historical load information of the current cell; or
historical load information of the neighbor cell;
wherein the model configuration information of the machine learning model comprises at least one of:
a machine learning model type;
an AI algorithm information;
information of a hardware platform on which the machine learning model is run; or
training configuration information of the machine learning model,
wherein the first message comprises one of:
a Next-Generation Radio Access Network (NG-RAN) Node Configuration Update message;
a Next generation nodeB Distribution Unit (gNB-DU) Configuration Update message;
a Next generation nodeB Central Unit (gNB-CU) Configuration Update message;
an EN-DC Configuration Update message; or
an AI Configuration Update message; and
wherein the model configuration information of the machine learning model comprises a machine learning model type, and wherein the machine learning model type comprises at least one of:
a time level model type;
a spatial level model type;
a historical level model type; or
a resemble model type.

16. The first network element of claim 15, wherein:
the AI algorithm information indicates at least one of:
an ARIMA algorithm;
a Prophet model algorithm;
a Random Forest algorithm;
a LSTM algorithm; or
an Ensemble Learning algorithm;
the hardware platform information comprises at least one of:
a GPU information;
an FPGA information;
an ASIC information; or
a SoC information; and
the training configuration information comprises at least one of:
a gradient configuration;
a weight configuration;
a derivation configuration; or
a size of training parameters of the machine learning model.

17. A non-transitory storage medium for storing computer readable instructions, the computer readable instructions, when executed by a processor in a first network element, causing the processor to:
send a first message for load prediction to a second network element, wherein the first message comprises at least one of an input to a machine learning model for load prediction of the first network element or model configuration information of the machine learning model;
receive a response message to the first message from the second network element;
wherein the input to the machine learning model comprises at least one of:
current load information of a current cell associated with and served by the first network element;
current load information of a neighbor cell of the current cell;
historical load information of the current cell; or
historical load information of the neighbor cell;
wherein the model configuration information of the machine learning model comprises at least one of:
a machine learning model type;
an AI algorithm information;
information of a hardware platform on which the machine learning model is run; or
training configuration information of the machine learning model,
wherein the first message comprises one of:
a Next-Generation Radio Access Network (NG-RAN) Node Configuration Update message;
a Next generation nodeB Distribution Unit (gNB-DU) Configuration Update message;
a Next generation nodeB Central Unit (gNB-CU) Configuration Update message;
an EN-DC Configuration Update message; or
an AI Configuration Update message; and
wherein the machine learning model type comprises at least one of:
a time level model type;
a spatial level model type;
a historical level model type; or
a resemble model type.

18. The non-transitory storage medium of claim 17, wherein:
the AI algorithm information indicates at least one of:
an ARIMA algorithm;
a Prophet model algorithm;
a Random Forest algorithm;
a LSTM algorithm; or
an Ensemble Learning algorithm;
the hardware platform information comprises at least one of:
a GPU information;
an FPGA information;
an ASIC information; or
a SoC information; and
the training configuration information comprises at least one of:
a gradient configuration;
a weight configuration;
a derivation configuration; or
a size of training parameters of the machine learning model.

19. The first network element of claim 15, wherein the response message comprises one of:
a NG-RAN Node Configuration Update Acknowledge message;
an AI Configuration Update Acknowledge message;
a gNB-DU Configuration Update Acknowledge message;
a gNB-CU Configuration Update Acknowledge message; or
an EN-DC Configuration Update Acknowledge message.

20. The non-transitory storage medium of claim 17, wherein the response message comprises one of:
a NG-RAN Node Configuration Update Acknowledge message;
an AI Configuration Update Acknowledge message;
a gNB-DU Configuration Update Acknowledge message;
a gNB-CU Configuration Update Acknowledge message; or
an EN-DC Configuration Update Acknowledge message.

* * * * *